US008707075B2

(12) United States Patent
Broad et al.

(10) Patent No.: US 8,707,075 B2
(45) Date of Patent: Apr. 22, 2014

(54) ADAPTIVE NETWORK AND METHOD

(75) Inventors: Alan Broad, Palo Alto, CA (US); Rahul Kapur, San Francisco, CA (US); Jaidev Prabhu, San Jose, CA (US); Martin Albert Turon, Berkeley, CA (US); Ning Xu, San Jose, CA (US); Xin Yang, San Leandro, CA (US); Matt Miller, Grass Valley, CA (US)

(73) Assignee: Memsic Transducer Systems Co., Ltd., Wuxi, Jiangsu Province (CN)

( * ) Notice: Subject to any disclaimer, the term of this patent is extended or adjusted under 35 U.S.C. 154(b) by 127 days.

(21) Appl. No.: 13/356,987

(22) Filed: Jan. 24, 2012

(65) Prior Publication Data

US 2012/0166848 A1      Jun. 28, 2012

Related U.S. Application Data

(60) Division of application No. 11/433,194, filed on May 11, 2006, now Pat. No. 8,115,593, which is a continuation-in-part of application No. 11/345,737, filed on Feb. 1, 2006, now Pat. No. 7,760,109, which is a continuation-in-part of application No. 11/152,350, filed on Jun. 13, 2005, now Pat. No. 8,144,197, which is a continuation-in-part of application No. 11/095,640, filed on Mar. 30, 2005, now Pat. No. 7,705,729, which is a continuation-in-part of application No. 11/096,098, filed on Mar. 30, 2005, now Pat. No. 7,369,047.

(51) Int. Cl.
| G06F 1/00 | (2006.01) |
| G08C 17/00 | (2006.01) |
| H04H 20/71 | (2008.01) |
| H04W 4/00 | (2009.01) |
| H04L 12/28 | (2006.01) |
| G08B 1/08 | (2006.01) |
| G08B 13/08 | (2006.01) |
| H04Q 5/22 | (2006.01) |

(52) U.S. Cl.
USPC ........... 713/323; 713/324; 370/311; 370/312; 370/313; 370/408; 340/539.22; 340/539.23; 340/539.3; 340/545.3; 340/10.33

(58) Field of Classification Search
USPC .................. 340/9.1, 10.1, 10.31, 10.3, 10.33, 340/10.34; 370/311, 278, 466
See application file for complete search history.

(56) References Cited

U.S. PATENT DOCUMENTS

| 4,002,886 A | 1/1977 | Sundelin |
| 4,418,333 A | 11/1983 | Schwarzbach et al. |

(Continued)

OTHER PUBLICATIONS

IEEE Instrumentation and Measurement Society, "IEEE Standard for a Smart Transducer Interface for Sensors and Actuators-Transducers to Microprocessor Communication Protocols and Transducers Electronic Data Sheet (TEDS) Formats", IEEE Std. 1451.2-1997, 1998, The Institute of Electrical and Electronics Engineers, Inc., 125 Pages.

(Continued)

*Primary Examiner* — Jennifer Mehmood
*Assistant Examiner* — John Mortell
(74) *Attorney, Agent, or Firm* — Preti Flaherty Beliveau & Pachios LLP

(57) ABSTRACT

A plurality of modules interact to form an adaptive network in which each module transmits and receives data signals indicative of the proximity of objects. A central computer accumulates the data produced or received and relayed by each module. One of the modules is operable as a leaf node having a sleep mode to conserve energy and an interactive mode. The central computer can send a message to the leaf node commanding it to stay awake in order to receive subsequent communications.

9 Claims, 13 Drawing Sheets

(56) References Cited

U.S. PATENT DOCUMENTS

| | | | |
|---|---|---|---|
| 4,766,295 | A | 8/1988 | Davis et al. |
| 5,352,957 | A | 10/1994 | Werner |
| 5,365,154 | A | 11/1994 | Schneider et al. |
| 5,640,151 | A | 6/1997 | Reis et al. |
| 5,673,031 | A * | 9/1997 | Meier ............................ 340/2.4 |
| 5,697,061 | A | 12/1997 | Krueger et al. |
| 5,742,833 | A * | 4/1998 | Dea et al. ...................... 713/323 |
| 5,841,365 | A | 11/1998 | Rimkus |
| 5,995,015 | A | 11/1999 | DeTemple et al. |
| 6,032,109 | A | 2/2000 | Ritmiller, III |
| 6,049,885 | A * | 4/2000 | Gibson et al. ................. 713/324 |
| 6,078,269 | A | 6/2000 | Markwell et al. |
| 6,208,247 | B1 | 3/2001 | Agre et al. |
| 6,243,654 | B1 | 6/2001 | Johnson et al. |
| 6,381,467 | B1 | 4/2002 | Hill et al. |
| 6,392,562 | B1 | 5/2002 | Boston et al. |
| 6,587,739 | B1 | 7/2003 | Abrams et al. |
| 6,690,289 | B1 | 2/2004 | Odinak et al. |
| 6,745,027 | B2 | 6/2004 | Twitchell, Jr. |
| 6,749,116 | B2 | 6/2004 | Massaro |
| 6,750,769 | B1 | 6/2004 | Smith |
| 6,822,568 | B2 | 11/2004 | Gehlot et al. |
| 6,844,821 | B2 | 1/2005 | Swartzel et al. |
| 6,859,831 | B1 | 2/2005 | Gelvin et al. |
| 6,961,709 | B2 | 11/2005 | Goodwin, III |
| 7,035,240 | B1 | 4/2006 | Balakrishnan et al. |
| 7,090,125 | B2 | 8/2006 | Goel et al. |
| 7,103,511 | B2 | 9/2006 | Petite |
| 7,152,040 | B1 | 12/2006 | Hawthorne et al. |
| 7,176,808 | B1 | 2/2007 | Broad et al. |
| 7,231,180 | B2 | 6/2007 | Benson et al. |
| 7,260,068 | B2 * | 8/2007 | Hsieh et al. ................... 370/311 |
| 7,298,716 | B2 * | 11/2007 | Abraham et al. ............. 370/321 |
| 7,318,010 | B2 * | 1/2008 | Anderson ..................... 702/188 |
| 7,349,360 | B2 * | 3/2008 | Gutierrez et al. ............. 370/315 |
| 7,360,095 | B2 | 4/2008 | Girouard et al. |
| 7,369,047 | B2 | 5/2008 | Broad et al. |
| 7,397,368 | B2 | 7/2008 | Otto et al. |
| 7,424,527 | B2 | 9/2008 | Petite |
| 7,429,936 | B2 | 9/2008 | Paradiso et al. |
| 7,440,735 | B2 | 10/2008 | Karschnia et al. |
| 7,483,403 | B2 * | 1/2009 | Herrmann et al. ............. 370/310 |
| 7,496,059 | B2 * | 2/2009 | Yoon .............................. 370/311 |
| 7,656,829 | B2 | 2/2010 | Kim et al. |
| 7,705,729 | B2 | 4/2010 | Broad et al. |
| 7,760,109 | B2 | 7/2010 | Broad et al. |
| 2002/0044533 | A1 | 4/2002 | Bahl et al. |
| 2003/0025599 | A1 | 2/2003 | Monroe |
| 2003/0043028 | A1 | 3/2003 | Torikai et al. |
| 2003/0063585 | A1 | 4/2003 | Younis et al. |
| 2004/0010492 | A1 | 1/2004 | Zhao et al. |
| 2004/0098218 | A1 | 5/2004 | Ito et al. |
| 2004/0122833 | A1 | 6/2004 | Forth et al. |
| 2004/0233284 | A1 | 11/2004 | Lesesky et al. |
| 2005/0032556 | A1 * | 2/2005 | Bennett et al. ................. 455/574 |
| 2005/0099500 | A1 | 5/2005 | Fujita |
| 2005/0131736 | A1 | 6/2005 | Nelson et al. |
| 2005/0218218 | A1 | 10/2005 | Koster |
| 2005/0237153 | A1 | 10/2005 | Chen |
| 2006/0085669 | A1 * | 4/2006 | Rostron et al. ..................... 714/4 |
| 2006/0120303 | A1 * | 6/2006 | Yarvis et al. ................... 370/254 |
| 2006/0130142 | A1 | 6/2006 | Mester et al. |
| 2006/0176239 | A1 | 8/2006 | Sweeney |
| 2006/0187040 | A1 | 8/2006 | Sweeney |
| 2006/0220843 | A1 | 10/2006 | Broad et al. |
| 2006/0229086 | A1 | 10/2006 | Broad et al. |
| 2006/0256772 | A1 | 11/2006 | Yarlagadda |
| 2006/0271667 | A1 | 11/2006 | Clow et al. |
| 2006/0291408 | A1 * | 12/2006 | Huang et al. .................. 370/311 |
| 2010/0157879 | A1 | 6/2010 | Broad et al. |

OTHER PUBLICATIONS

IEEE Standard for a Smart Transducer Interface for Sensors and Actuators-Mixed-Mode Communication Protocols and Transducer Electronic Data Sheet (TEDS) Formats, IEEE Standards 1451.4-2004, IEEE Instrumentation and Measurement Society, 2004, 439 Pages.

Crossbow Technology, "Xmesh Network Layer," 2006, 1 Page.

U.S. Appl. No. 11/152,350, filed Jun. 13, 2005, 33 Pages.

* cited by examiner

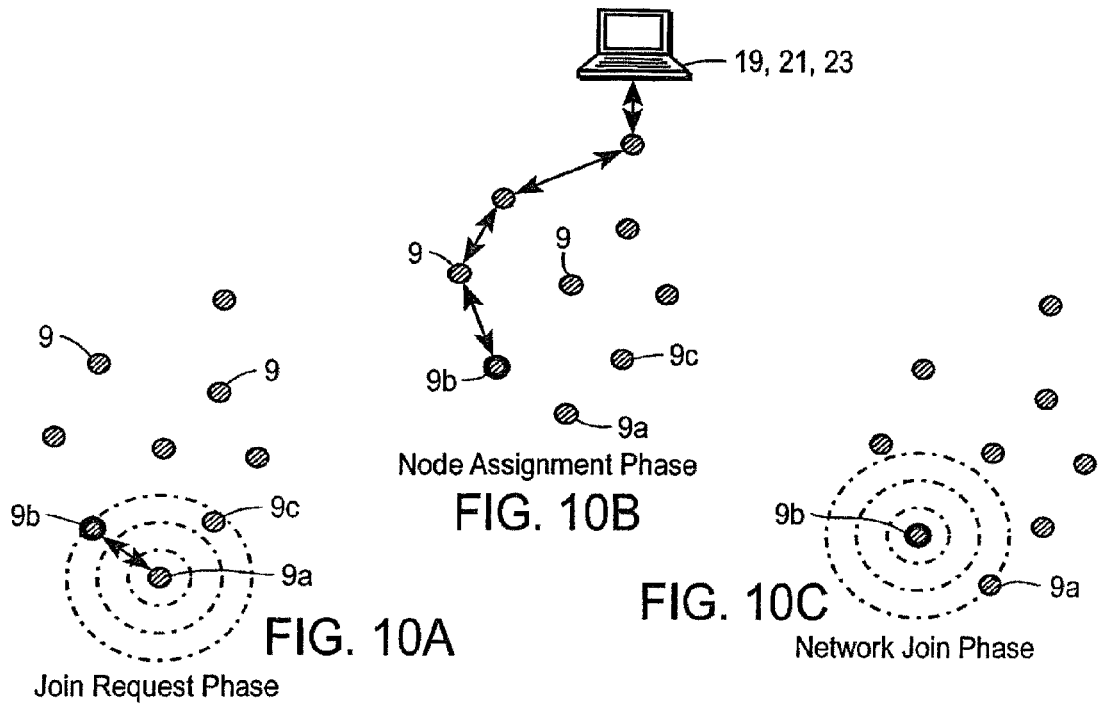
FIG. 10B Node Assignment Phase
FIG. 10A Join Request Phase
FIG. 10C Network Join Phase
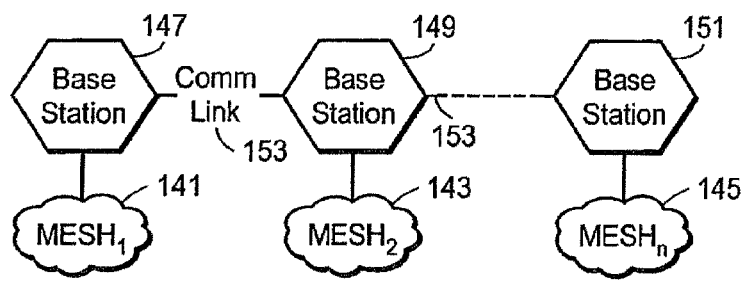
FIG. 11
TABLE
|  | 1st Time Interval | | | | 2nd Time Interval | | | |
|---|---|---|---|---|---|---|---|---|
| Time Slots | 1 | 2 | 3 | 4 | 1 | 2 | 3 | 4 |
| Network 1 Channel | 1 | 2 | 3 | 4 | 1 | 2 | 3 | 4 |
| Network 2 Channel | 2 | 3 | 4 | 1 | 2 | 3 | 4 | 1 |
| Network 3 Channel | 3 | 4 | 1 | 2 | 3 | 4 | 1 | 2 |
| Network 4 Channel | 4 | 1 | 2 | 3 | 4 | 1 | 2 | 3 |
FIG. 12

ADAPTIVE NETWORK AND METHOD

RELATED APPLICATION

This application is a division of application Ser. No. 11/433,194 entitled "Adaptive Network And Method," filed on May 11, 2006 now U.S. Pat. No. 8,115,593 which is a continuation-in-part of, and claims priority from, application Ser. No. 11/345,737 entitled "Interactive Surveillance-Network and Method," filed on Feb. 1, 2006 by A. Broad et al, which issued as U.S. Pat. No. 7,760,109, which is a continuation-in-part of application Ser. No. 11/152,350 entitled "Adaptive Surveillance Network and Method," filed on Jun. 13, 2005 by A. Broad, which issued as U.S. Pat. No. 8,144,197, which is a continuation-in-part of application Ser. No. 11/095,640 entitled "Surveillance System and Method," filed on Mar. 30, 2005 by A. Broad et al, which issued as U.S. Pat. No. 7,705,729, which is a continuation-in-part of application Ser. No. 11/096,098 entitled "Adaptive Sensing Network," filed Mar. 30, 2005 by A. Broad et al, which issued as U.S. Pat. No. 7,369,047, which applications are incorporated herein in the entirety by this reference to form a part hereof.

FIELD OF THE INVENTION

This invention relates to adaptive networks and more particularly to a self-adaptive network array of interactive modules that communicate information to local or central computers that issue commands for designated modules in the network.

BACKGROUND OF THE INVENTION

Typical surveillance systems that are used to secure buildings or borders about a secured area commonly include closed-circuit video cameras around the secured area, with concomitant power and signal cabling to video monitors for security personnel in attendance to observe video images for any changed circumstances. Additionally, lighting may be installed about the area, or more-expensive night-vision equipment may be required to facilitate nighttime surveillance. Appropriate alarms and corrective measures may be initiated upon observation of a video image of changed circumstances that prompt human analysis and manual responses. These tactics are commonly expensive for video cameras and lighting installations and for continuing labor expenses associated with continuous shifts of attendant personnel.

More sophisticated systems commonly rely upon image-analyzing software to respond to image changes and reject false intrusion events while segregating true intrusion events for controlling appropriate alarm responses. However, such sophisticated systems nevertheless commonly require permanent installations of sensors, lighting and cameras with associated power and cabling that inhibit rapid reconfiguration, and that increase vulnerability to breakdown due to severing of wiring and cabling, or to unreliable operations upon exposure to severe weather conditions.

In a wireless network of interactive modules, it may be desirable at times to update the software code that runs on the individual modules of the network. Since these networks may include perhaps hundreds of individual modules, manually loading the code can be time consuming and labor intensive for a field support person going to each module and via a portable processor transferring the new code to each module and then having each module restart with the new code.

In such wireless networks of interactive modules that self-adapt to changing transmission conditions, it is desirable to have most remote modules (also referred herein as 'leaf nodes') to conserve power while not interacting via transmitted or received signals by reverting to 'sleep' mode of operation. However, over long sleep intervals conditions for interactive communications may have changed. Accordingly, it is desirable to awaken a leaf node via an operating sequence that conserves power through operational procedures which analyze changed network conditions to restore interactive operation of the leaf node within the newly-configured network.

SUMMARY OF THE INVENTION

In accordance with one embodiment of the present invention; a plurality of individual mobile transceiver modules may be deployed around the perimeter of an installation to be secured in order to sense and transmit information about activity within a vicinity of a transceiver module. Each module wirelessly communicates its own sensory data and identity information to one or more similar adjacent modules, and can relay data signals received from one or more adjacent modules to other adjacent modules in the formation of a distributed self-adaptive wireless network that may communicate with a central computer. Such interaction of adjacent modules obviates power wiring and signal cabling and the need for an electromagnetic survey of an area to be secured, and promotes convenient re-structuring of perimeter sensors as desired without complications of re-assembling hard-wired sensors and monitors. In addition, interactions of adjacent modules establish verification of an intrusion event that is distinguishable from false detection events, and promote rapid coordinate location of the intrusion event for follow-up by computer-controlled video surveillance or other alarm responses. Multiple modules are deployed within and about a secured area to automatically configure a wirelessly-interconnected network of addressed modules that extends the range of individual radio transmission and identifies addressed locations in and about the secured area at which disabling or intrusion events occur. Frequency-shifting schemes among the modules inhibit jamming or unauthorized disabling of the network, and new modules may be added to the network in synchronism with prevailing reference frequency. The network of modules may be expanded about individual base stations that each operate on separate reference frequencies that are shifted synchronously in non-overlapping relationship. In this way, modules operating in one network associated with one base station are segregated from interaction with modules operating in another network, even within sufficient proximity to directly communicate if not so inhibited by distinctive reference frequencies. Modules are fabricated to include unique ID codes and ability to operate on a common set of different reference frequencies in order to be compatibly operable in an assembled network of such modules. Individual modules within the entire network may be reprogrammed from the base station over the radio links between modules.

Each of the wireless modules may be powered by batteries that can be charged using solar cells, and may include an individual video camera, all packaged for mobile deployment, self-contained operation and interaction with other similar modules over extended periods of time.

BRIEF DESCRIPTION OF THE DRAWINGS

FIGS. 10A, B, C are pictorial illustrations of operating modes of an interactive surveillance network in accordance with the present invention;

FIG. 11 is a pictorial illustration of an expanded network in accordance with the present invention;

FIG. 12 is a table showing a sample sequence of frequency-hopping operation according to the present invention;

DETAILED DESCRIPTION OF THE INVENTION

Figure 1:
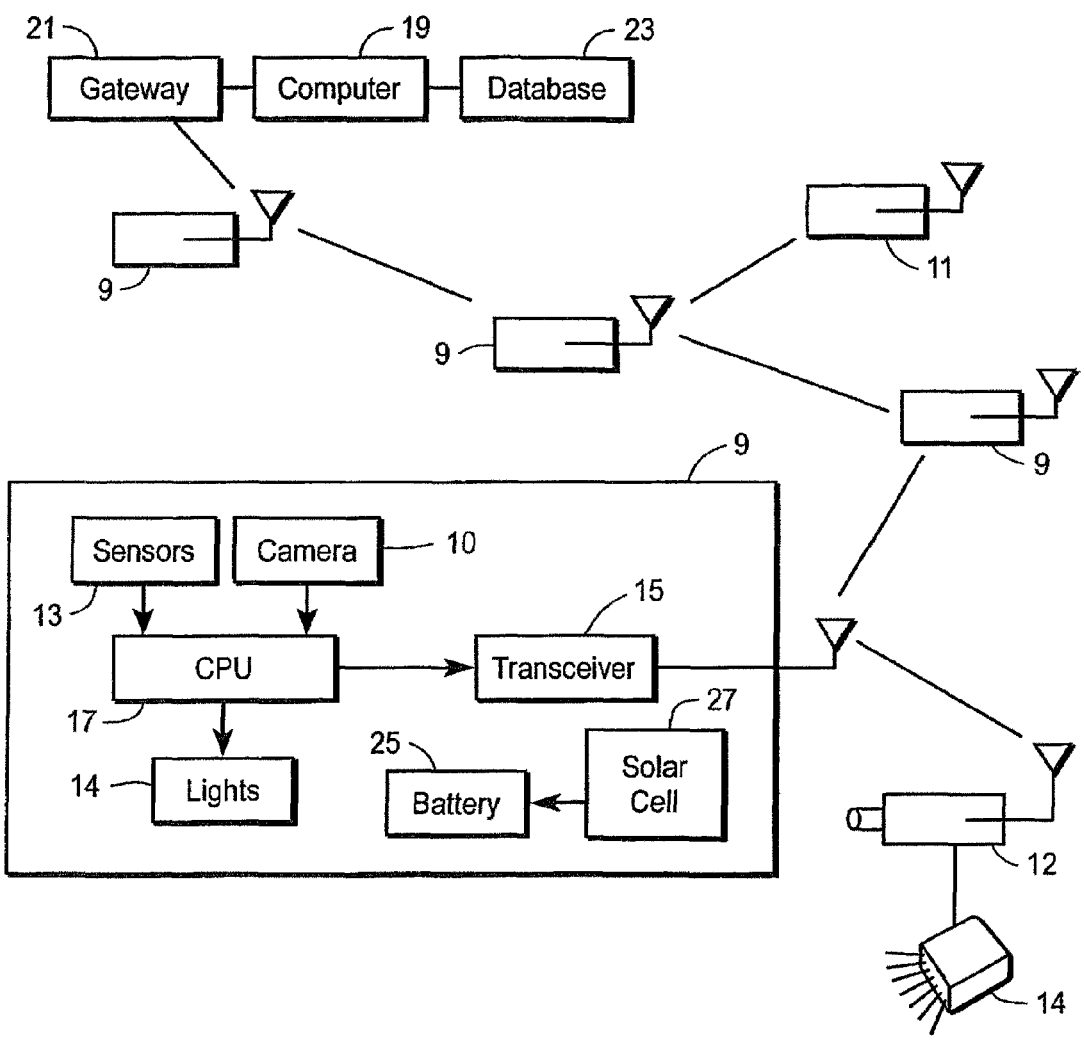
FIG. 1 is a pictorial block diagram of a plurality of sensor modules in accordance with an embodiment of the present invention.

Referring now to FIG. 1, there is shown a plurality of individual sensor modules 9 deployed at spaced locations, for example, along a peripheral boundary of an area to be secured. Of course, additional sensor modules 11 may be deployed along pathways or entryways or other locations within the area to be secured in order to monitor traffic or other activities.

Each sensor module 9, 11 includes a proximity sensor 13 that may be, for example, a passive infrared sensor that responds to the presence or proximity of a warm object such as an individual, vehicle, or the like. Alternatively, the proximity sensor 13 may be an active infrared or radio or ultrasonic sensor that emits a signal and senses any echo attributable to presence of a reflective object within a sensing field of view. Of course, other sensors such as vibration detectors or light detectors may be used to respond to the presence of an intruding object.

In addition, each sensor module 9 includes a transceiver 15 that responds to radio transmissions from other similar modules, and also transmits radio signals to other modules for reception and relay or re-transmission thereby of such received signals. In this way, an array of modules 9, 11 forms an interactive, distributed network that operates self-adaptively on operative modules 9. Thus, if one module 9, 11 is added, removed or is rendered inoperative, then adjacent operative modules 9, 11 are capable of interacting to reconfigure a different distributed array, as later described herein.

Each sensor module 9, 11 also includes a processor 17 that controls operation of the transceiver 15 and proximity sensor 13 to produce data signals for transmission via the transceiver 15 to one or more adjacent modules 9, 11. In addition, the processor 17 may control random recurrences of monitoring events to amass information about any changes in circumstances associated with proximate objects, for conversion to data signals to be transmitted via transceiver 15. Each processor 17 may include alarm utilization circuitry for initiating alarms, commencing video surveillance via local video camera 10, or the like, upon command or upon sensing a change in proximity circumstances. Alternatively, the distributed network of modules 9, 11 may also communicate with a central computer 19 via a transceiver 21 acting as a gateway between the computer 19 and the distributed array of modules 9, 11 for communicating signals between the computer 19 and the network of interactive modules 9, 11, 12. Computer 19 may operate on a database 23 of address or identification code for each module 9, 11, 12 in order to communicate through the network of modules 9, 11 that each have different addresses or identification codes, to a particular module having a selected address. In this way, each module 9, 11, 12 may transmit and receive data signals specifically designating the module by its unique identification code or address. And, each module 9, 11, 12 is powered by self-contained batteries 25 and/or photovoltaic cells 27 that also operate to charge the batteries 25.

Figure 4:
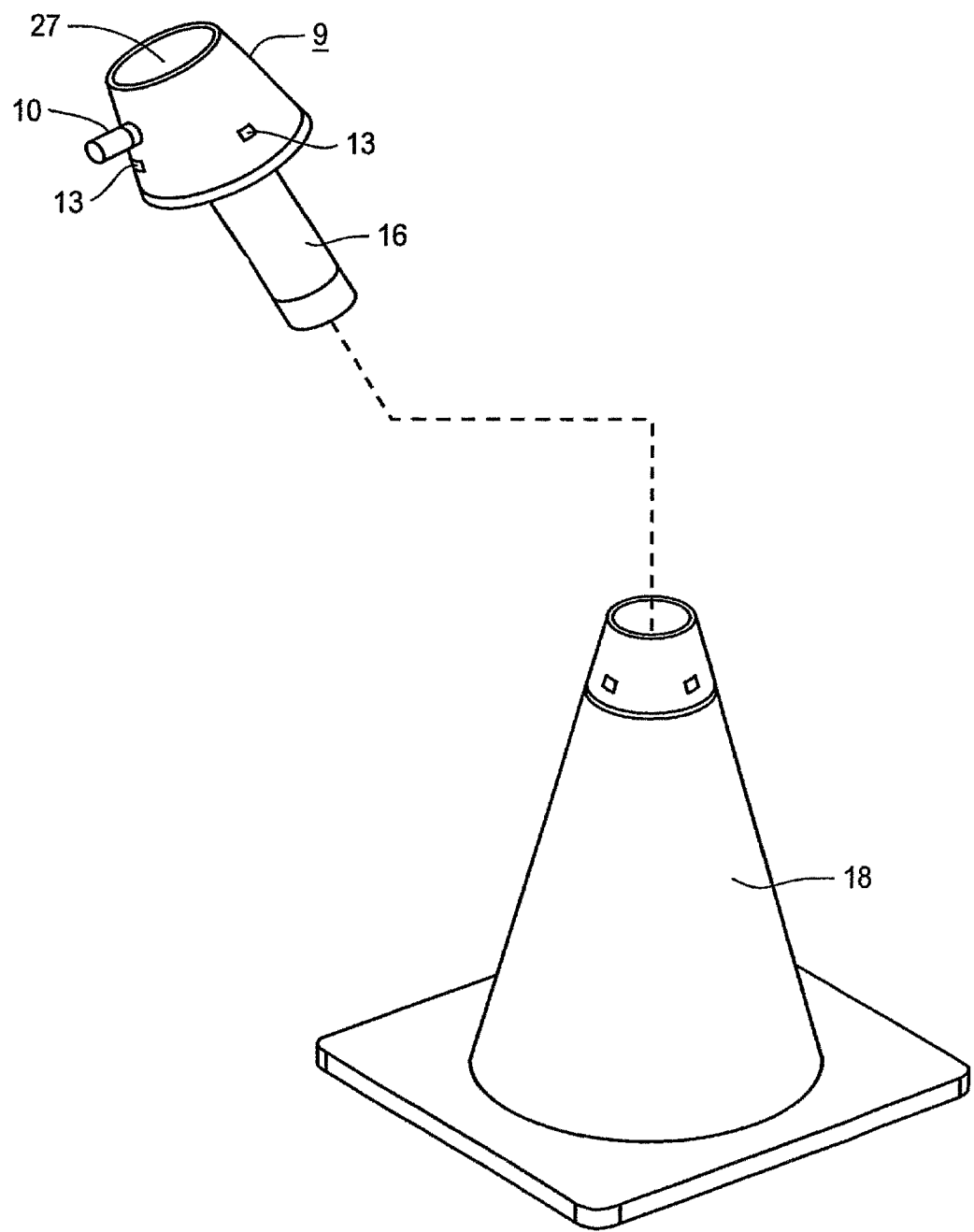
FIG. 4 is an exploded view of one configuration of a sensor module in accordance with the embodiment of FIG. 1.

The modules 9, 11 may be disposed within conventional traffic-marking cones, as illustrated in FIG. 4, for convenient mobile placement or may be mounted on fence posts, or may be mounted on spikes driven into the ground within and about an area to be secured, or may be otherwise suitably mounted in, on and about areas or passageways that are to be secured against unauthorized intrusions.

The plurality of modules 9, 11 may interact, as later described herein, to distinguish between a false intrusion detection event and a true event for which alarm and other responses should be initiated. Certain proximity sensors such as passive infrared sensors or ultrasonic sensors may respond to a breeze of different temperature, or to objects blowing by in a strong wind and thereby create a false intrusion detection.

In accordance with an embodiment of the present invention, such false intrusion detections are recognized to be predominantly random events attributable to stimulation of one sensor and likely not an adjacent sensor. Thus, correlation of sensor events among multiple adjacent sensors permits discrimination against false intrusion detections. Additional information is extracted throughout the network of multiple sensors, for example, responsive to an entry location and to movement along a path of travel. The additional information including, for example, time and duration and location of one or more sensor stimulations may be transmitted back to the central computer 19 through the network of modules 9, 11 for computerized correlation analysis of the additional information to verify a true intrusion event. Alternatively, modules 9, 11 disposed within or about a small area may communicate the additional information between modules to correlate the sensor stimulations and locally perform computerized correlation analysis within one or more of the processors 17 to verify a true intrusion event.

Additionally, the sensor information derived from a plurality of adjacent or neighboring modules 9, 11 may be analyzed by the central computer 19, or by local processors 17, to triangulate the location and path of movement of an intruder for producing location coordinates to which an installed video surveillance camera may be aligned. Thus, one or more stand-alone, battery-operated video surveillance cameras 12 with different addresses in the network may be selectively activated in an adjacent region only upon true intrusion events in the region for maximum unattended battery operation of the cameras 12. Such cameras 12 of diminutive size and low power consumption (such as commonly incorporated into contemporary cell phones) may operate for brief intervals during a true intrusion event to relay image data through the network of modules 9, 11 for storage in the database 23 along with such additional information as time of intrusion, duration and coordinates along a path of movement through the secured area, and the like. Alternatively, such cameras 10 of diminutive size may be housed in a module 9, 11 or conventional surveillance cameras 12 may be mounted in protected areas in association with high-level illumination 14 to be activated in response to an addressed command from computer 19 following analysis thereby of a true intrusion. Of course, battery-powered lighting 14 may also be incorporated into each module 9, 11 to be energized only upon determination by one or more processors 17, or by central computer 19, 21, 23 of a true intrusion occurring in the vicinity of such module 9, 11. Additionally, the video surveillance cameras 10, 12 may be operated selectively under control of the central computer 19, 21, 23 during no intrusion activity to scan the adjacent vicinity in order to update the database 23, 45 with image data about the local vicinity.

Figure 2:
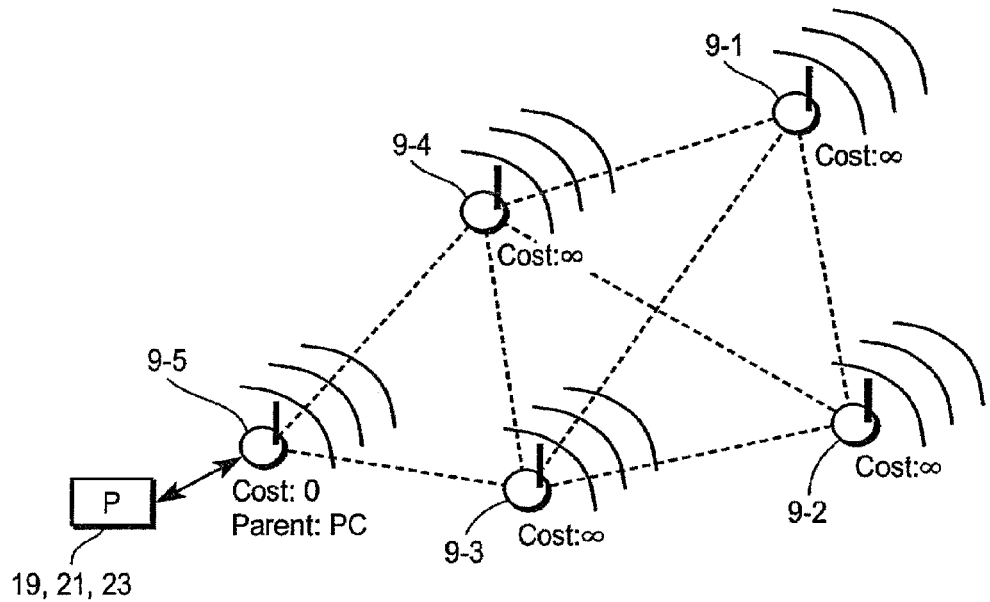
FIG. 2 is a pictorial illustration of an array of spaced modules upon initialization of the adaptive network.

Referring now to the FIG. 2 illustration of a typical network that requires initialization, it may be helpful for understanding the formation of such a network to consider 'cost' as a value or number indicative of the amount of energy required to transmit a message to another receiving module. Higher cost translates, for example, into higher energy consumption from limited battery capacity in each module. In order for an adaptive network to form, a module (9-1 to 9-5) must select a parent or superior node to which to forward messages. The radio transmissions or beacons from neighboring modules (NM) inform a module about how well the NM's can receive its messages which include cost for the NM's to forward a message toward a base station, together with a 'hop' count (i.e., number of repeater or message relay operations) to such base station. This may not be enough information by which a module as a subordinate node can select a parent or superior node since a radio link may be highly asymmetrical on such two-way communications. Thus, a NM may receive clearly from a module but the module may not receive clearly from the NM. Selecting such NM as a parent would result in a poor communication link resulting in many message repeats and acknowledgements at concomitant cost.

However, such a module (9-1 to 9-5) can also 'overhear' a NM's transmissions that include the NM's neighborhood list (NL) as a pre-set maximum number, say 16, of modules from which the NM can receive. For greater numbers of modules, the NM excludes from the NL those modules with poor or lower-quality reception. Thus, if a receiving module does not detect its broadcast address or ID in a potential parent's NL, then that NM will not be selected as a parent. A base station (e.g., 9-5 connected to central computer 19, 21, 23) may be set to accommodate a larger number of modules in its NL to handle more children or subordinate modules for greater prospects of assembling an efficient adaptive network through some selection of modules and relay operations therebetween.

Transmitted messages from a module (9-1 to 9-5) contain several factors, including:

a) cost, as a number to be minimized which indicates to NM's the amount of energy required to transmit to a base station. The cost is a summation of all costs of all 'hops' to the base station (a base station 9-5 has zero cost to forward messages, so its messages are distinctive from messages of possible parent modules); and b) the number of 'hops' to send a message to the base station; and c) a packet sequence number (e.g., 16-bit integer) that is incremented every time a message is transmitted from the base station 9-5 or other module 9-1 to 9-4; and d) a neighborhood list (NL) of all other modules in the vicinity from which the base station or other module can receive, including:

i) the ID of each NM; and ii) a reception estimate of how well a module receives messages from such NM as determined from processing the sequence numbers in such message packets to compute a percent of lost packets.

Therefore, a module (9-1 to 9-5) may calculate a probability factor (PF) of success in transmitting to a possible parent, as:

$$PF = (\% \text{ of module's packets received by NM}) \times (\% \text{ of possible parent's packets received by module}).$$

Each module (9-1 to 9-4) may thus calculate its own cost (OC) of sending a message to the base station (9-5), as:

$$OC = \text{cost of NM/PF}.$$

A module selects lowest OC to send a message.

As illustrated in FIG. 2, initialization of the network is facilitated by the base station (9-5) broadcasting a message including zero costs. In contrast, messages broadcast by all other modules (9-1 to 9-4) initially include infinite cost (since not yet determined how to route messages to the base station). And, there are no entries in the NL in initial broadcast messages. Data messages from a module are sent with a broadcast address since no parent has been selected. Modules (e.g., 9-3 and 9-4) that can receive base station messages from module 9-5 containing zero cost information will recognize that they can forward messages to such base station. Then, messages forwarded by modules 9-3 and 9-4 within the reception vicinity of the base station 9-5 enable the base station to assemble and include within their messages a NL of modules (including modules 9-3 and 9-4) that receive the base station messages. And, these modules then include the base station and other NM in their NL within broadcast messages. A parent (e.g., module 9-4) is then selected as a superior node by other modules as subordinate nodes whose messages each change from a broadcast address to the parent's address. The network formation thus propagates across the array to more remote nodes (e.g., modules 9-1 and 9-2) that are not in the reception vicinity of the base station 9-5.

Figure 3:
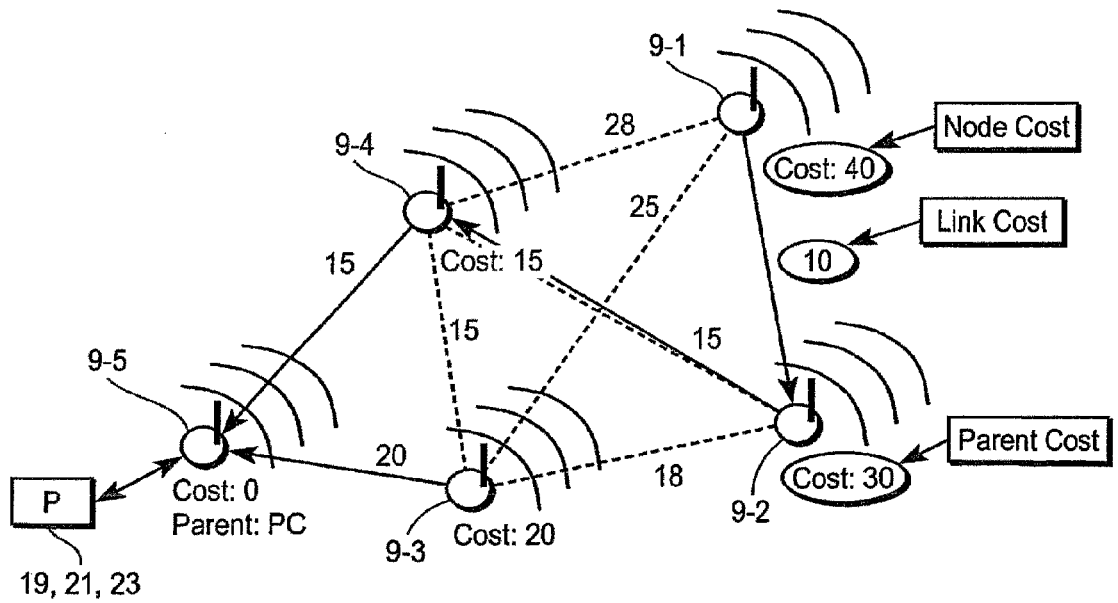
FIG. 3 is a pictorial illustration of the array of FIG. 2 following formation of an interactive network.

Thus, as illustrated in FIG. 3, each module (e.g., module 9-1) may calculate a node cost as the parent's cost plus the cost of the link to the parent (e.g., 9-2). Similarly, each communication link toward the base station (e.g., module 9-5) will be selected by lowest cost (e.g., via module 9-4 rather than via module 9-3) as the network adapts to the existing transmission conditions. In the event the cost parameters change due, for example, to addition or re-location or inoperativeness of a module, then a transmission path to the base station for a remote module will be selected on such lower cost (e.g., from module 9-2 via module 9-3, or from module 9-1 via module 9-4 or 9-3), and such replaced module will be identified by the absence of its address in successive transmission by other, adjacent modules or in failure of response to a polling command from computer 19, 21, 23 (e.g., module 9-5).

Referring now to FIG. 4, there is shown a pictorial exploded view of one embodiment of the modules according to the present invention. Specifically, the module 9 may be configured in one embodiment as a truncated cone with a descending attached housing 16 that is suitably configured for containing batteries 25. The top or truncation may support photovoltaic or solar cells 27 that are connected to charge batteries 25. The module 9 conforms generally to the conical shape of a conventional highway marker 18 and is dimensioned to fit into the top or truncation of the highway market 18 as one form of support. Such cones may be conveniently stacked for storage. Of course, the module 9 may be suitably packaged differently, for example, as a top knob for positioning on a fence post, or the like.

The module 9 includes one or more proximity sensors 13 such as infrared detectors equipped with wide-angle lenses and disposed at different angular orientations about the periphery of the module 9 to establish overlapping fields of view. One or more miniature video cameras 10 may also be housed in the module 9 to include azimuth, elevation and focus operations under control of processor 17 in conventional manner.

Figure 5:
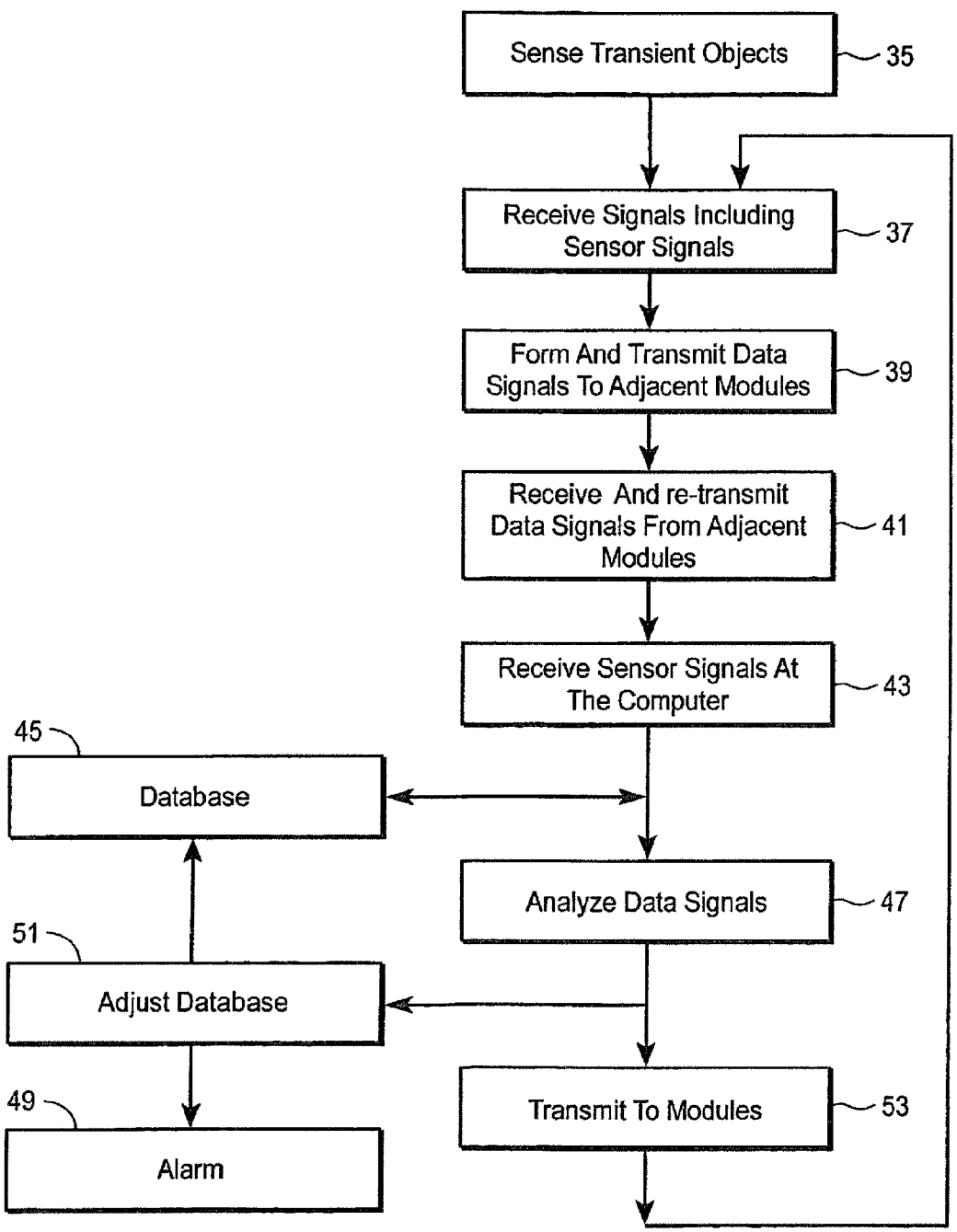
FIG. 5 is a flow chart illustrating an operational embodiment of the present invention.

Referring now to FIG. 5, there is shown a flow chart illustrating one operating embodiment of the present invention in which a proximity-sensing module detects 35 the transient presence of an object. Such detection may be by one or more of passive infrared or acoustic or magnetic sensing, or by active transmission and reception of transmitted and reflected energy. Such proximity sensing may be sampled or swept along all directional axes oriented about the placement of each module. The processor 17 in each module 9, 11 controls operation of the proximity sensor 13 of that module in order to generate data signals for transmission 39 to adjacent modules. The processor 17 may establish sensing intervals independently, or in response 37 to transmission thereto (via designated address or identification code) of commands from the central computer 19.

In addition to transmitting its own generated data signals, a module 9 receives and relays or re-transmits 41 data signals received from adjacent modules in the array of modules 9, 11, 12. Such data signals generated and transmitted or received and re-transmitted by a module among modules are received 43 by the central computer 19 which may analyze 47 the data signals to triangulate the location and path of movement of an intruder, or may analyze 47 the data signals relative to a database 45 of information, for example, regarding conditions about each selected module 9, 11, 12 or to compare intruder images against database images of the vicinity in order to trigger alarm conditions 49, or adjust 51 the database, or transmit 53 data or command signals to all or selected, addressed modules 9, 11, 12. One typical alarm response 49 may include commands for operation of an installed video surveillance camera 12 and associated high-level illumination 14 via its designated address as located in the vicinity of a detected true intrusion.

Computer analysis of data signals from adjacent addressed modules 9, 11 may profile the characteristics of changed circumstances in the vicinity of the addressed modules, and may identify an intruding object from database information on profiles and characteristics of various objects such as individuals, vehicles, and the like. The processor 17 of each module may include an output utilization circuit for controlling initialization of alarm conditions, or video surveillance of the vicinity, or the like. In addition, alarm utilization 49 determined from analyses of received data signals by the central computer 19 may facilitate triangulating to coordinates of the intrusion locations and along paths of movement for controlling camera 12 surveillance, and may also actuate overall alarm responses concerning the entire secured area.

In another operational embodiment of the present invention, the network assembled in a manner as previously described herein operates in time synchronized mode to conserve battery power. In this operating mode, the control station (e.g., computer 19) periodically broadcasts a reference time to all modules 9, 11, 12 in the network, either directly to proximate modules or via reception and re-broadcasts through proximate modules to more remote modules. Modules may correct for propagation delays through the assembly network, for example, via correlation with accumulated cost numbers as previously described herein.

Once all modules 9, 11, 12 are operable in time synchronism, they reduce operating power drain by entering low-power mode to operate the transceivers 15 only at selected intervals of, say, every 125-500 milliseconds. In this wake-up interval of few milliseconds duration, each transceiver transmits and/or receives broadcast data messages (in the absence of an intrusion anywhere), for example, of the type previously described to assess continuity of the assembled network, or to re-establish communications in the absence or failure of a module 9, 11, 12 previously assembled within the network.

In the presence of an intrusion detected by one module 9, 11, such time synchronism facilitates accurately recording time of detection across the entire network and promotes accurate comparisons of detection times among different modules. This enhances accuracy of triangulation among the modules 9, 11 to pinpoint the location, path of movement, time of occurrences, estimated trajectory of movement, and the like, of an actual intruder. In addition, with surveillance cameras 10, 12 normally turned off during low-power operating mode, true intrusion as determined by such time-oriented correlations of intruder movements among the modules 9, 11, 12 more accurately activates and aligns the cameras 10, 12 for pinpoint image formation of the intruder over the course of its movements.

The imaging of a true intrusion is initiated by a sensor 13 detecting some object not previously present within its sensing field of view. This 'awakens' or actuates the CPU 17 to full performance capabilities for controlling broadcast and reception of data signals between and among adjacent modules in order to determine occurrence of a true intrusion. Thus, modules 9, 11 within the sensor field of view of an intruder may communicate data signals to verify that all or some of the proximate modules 9, 11 also detect the intrusion. An intrusion sensed by one module 9, 11 and not also sensed by at least one additional module may be disregarded as constituting a false intrusion or other anomaly using a triangulation algorithm or routine. The CPU's 17 of the modules 9, 11 within range of the intruding object determine the relative locations and control their associated cameras 10, 12 to scan, scroll and zoom onto the intruder location from the various module locations. If intrusion activity is sensed during nighttime (e.g., indicated via solarcell inactivity), then associated lighting 10, 14 may also be activated under control of the associated CPU 17. If other adjacent modules do not sense or otherwise correlate the intruder information, the intrusion is disregarded as false, and the modules may return to low-power operating mode.

Camera images formed of a true intrusion are broadcast or relayed and re-broadcast over the network to the central computer 19 for comparisons therewith image data in database 23 of the background and surroundings of the addressed modules 9, 11 that broadcast the intruder image data. Upon positive comparisons of the intruder image data against background image data, the central computer 19 may then broadcast further commands for camera tracking of the intruder, and initiate security alerts for human or other interventions.

In time synchronized manner, in the absence of any sensed intrusion, the central computer 19 periodically broadcasts a command to actuate cameras 10 of the modules 9, 11, 12 to scan the surroundings at various times of day and night and seasons to update related sections of the database 23 for later more accurate comparisons with suspected intruder images.

Figure 6:
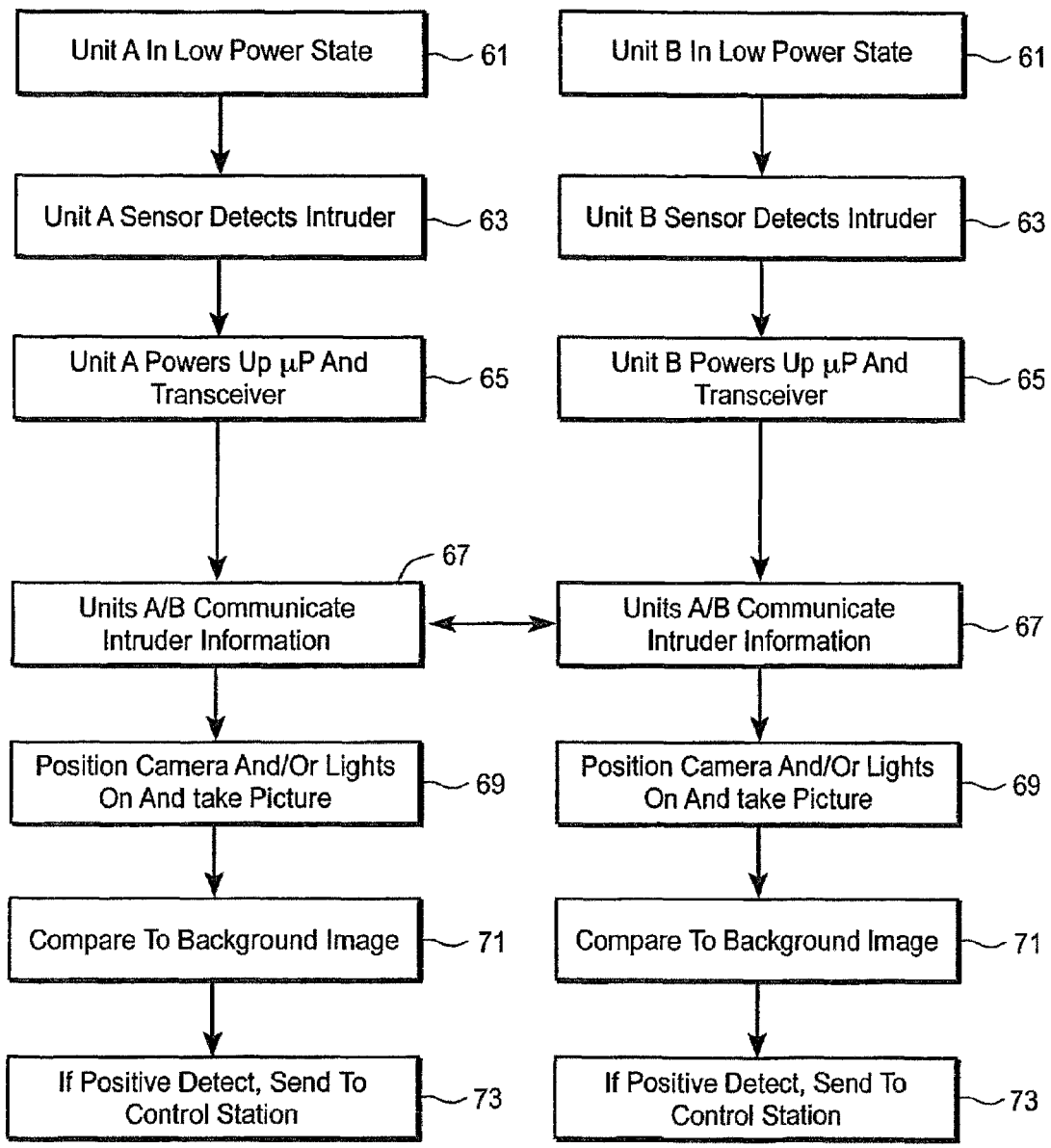
FIG. 6 is a flow chart illustrating another operational embodiment of the present invention.

Referring now to FIG. 6, there is shown a flow chart of operations among adjacent modules 9, 11, 12 in a network during an intrusion-sensing activity. Specifically, a set of units A and B of the modules 9, 11, 12 are initially operating 61 in low-power mode (i.e., and transceiver 15 and camera 10 and lights 14 unenergized, and CPU 17 in low-level operation), these units A and B may sense an intruding object 63 at about the same time, or at delayed times that overlap or correlate as each sensor 'awakens' 65 its associated CPU or micro-processor and transceiver to full activity. This enables the local CPU's or microprocessors of the units A and B to communicate 67 the respective intruder information to each other for comparisons and initial assessments of a true intrusion. Local cameras and lights may be activated 69 and controlled to form intruder image data for transmission back through the assembled network to the central computer 19. There, the image data is compared 71 with background image data from database 23 as stored therein by time of day, season, or the like, for determination of true intrusion. Upon positive detection of an intrusion, commands are broadcast throughout the network to activate cameras (and lights, as may be required) in order to coordinate intrusion movements, path, times of activities, image data and other useful information to log and store regarding the event. In addition, alarm information may be forwarded 73 to a control station to initiate human or other intervention. Of course, the lights 14 may operate in the infrared spectral region to complement infrared-sensing cameras 10 and to avoid alerting a human intruder about the active surveillance.

In accordance with another embodiment of the present invention each module 9 is initially fabricated with a unique ID code (analogous to or associated with its serial number) and with a capability of operating on one of any number of different operating RF frequencies. In this way, different distributed networks of such modules may be operated in coordinated, expanded regions to avoid significant limitations on number of modules operable in a region of overall surveillance. Also, such modules that are capable of operating at different RF frequencies (as the carrier or reference frequency) can be operated in time-oriented frequency-hopping mode to inhibit jamming or otherwise disabling an operating network.

Specifically, then, for a module 9 to be operably compatible with other modules in an assembled network of modules, each such module 9 is preconfigured, either as fabricated or as assigned upon entry into a network (as later described herein), with a few unique parameters. These include a unique operating frequency (or set of different operating frequencies) and a Group ID that enables a module 9 to operate only within its own networks group, a node address (to identify physical location within a network), and a network ID as fabricated (analogous to a unique serial number, as perhaps a 64-bit code). Alternatively, operability of a module 9 on a particular reference or carrier frequency (or set of such frequencies) may be all that is required for operation with other modules 9 in a distributed network. Other of these parameters may be desirable for exclusion of counterfeit modules from an operable network, or for efficient, low-power operation, and the like, as later described herein.

One overall objective of the present invention is to conveniently facilitate introduction of a new module into an operational assembly of such modules without need to preset or re-set operating parameters to new conditions or values sufficient to accommodate the new module. For convenient description herein, the following terms are used to describe the modules 9, the network, and operations thereof.

Base Station: computer-based controller and coordinator of overall network operations.

Joined Node: a module 9 currently operable in a network that has a NODE ADDR (node address) and GROUP ID (group identification code) and RADIO FREQUENCY (RF or set of RF operating frequencies).

New Node: a module 9 seeking to obtain operational access within a network of Joined Nodes under control of a Base Station.

Each operably compatible module also has a unique ID that is installed as fabricated. Each Base Station stores a list of compatible ID codes (to inhibit inclusion of counterfeit or unauthorized modules), and stores one or more Radio Frequencies on which the network of modules is operable, and also generates and stores a list of unique Group ID's that can be assigned to modules 9, with an associated physical address by various coordinate, or other, schemes, to designate the location of a module.

Figure 7:
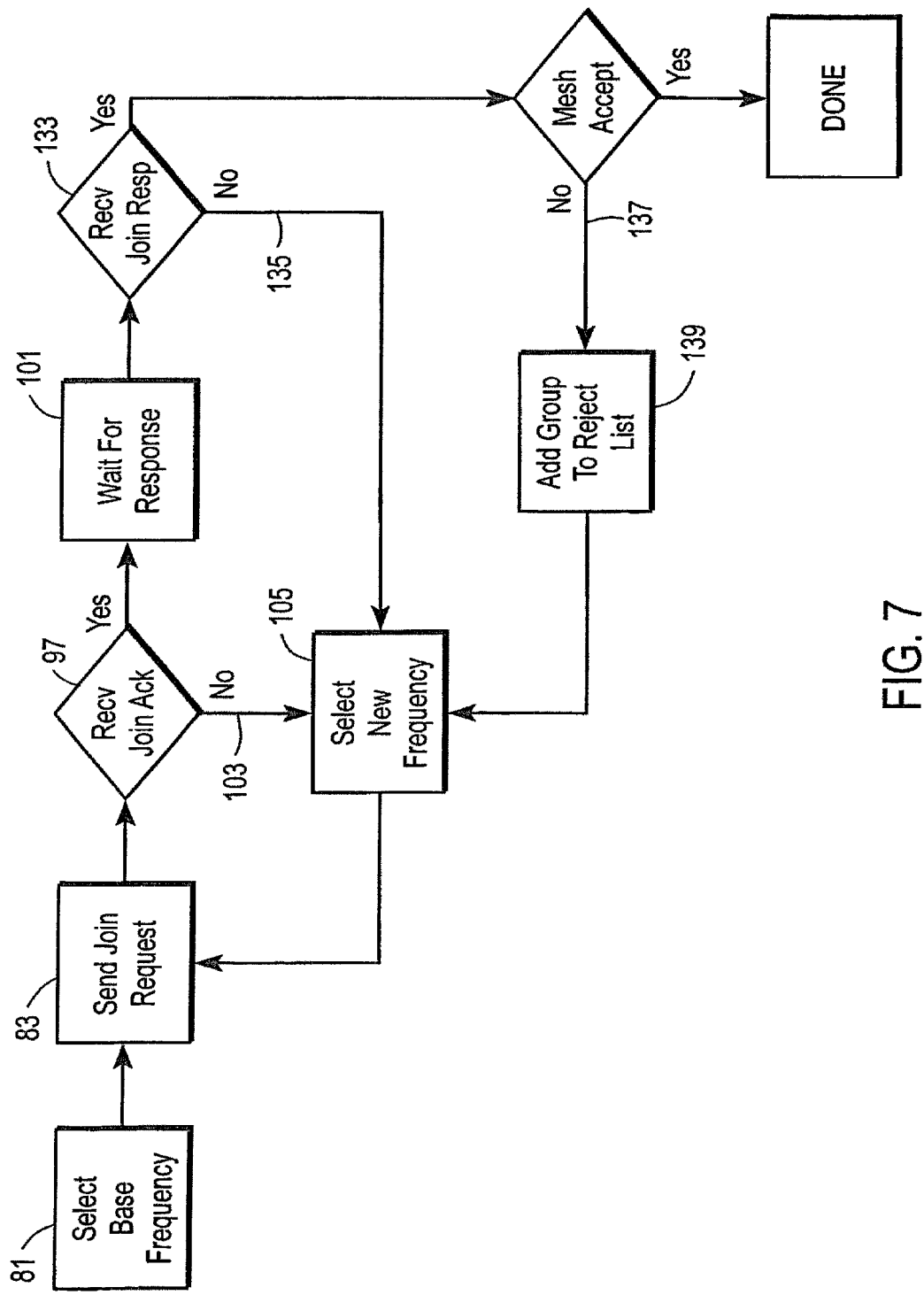
FIG. 7 is a flow chart illustrating operation of a New Node in accordance with the present invention.
Figure 8:
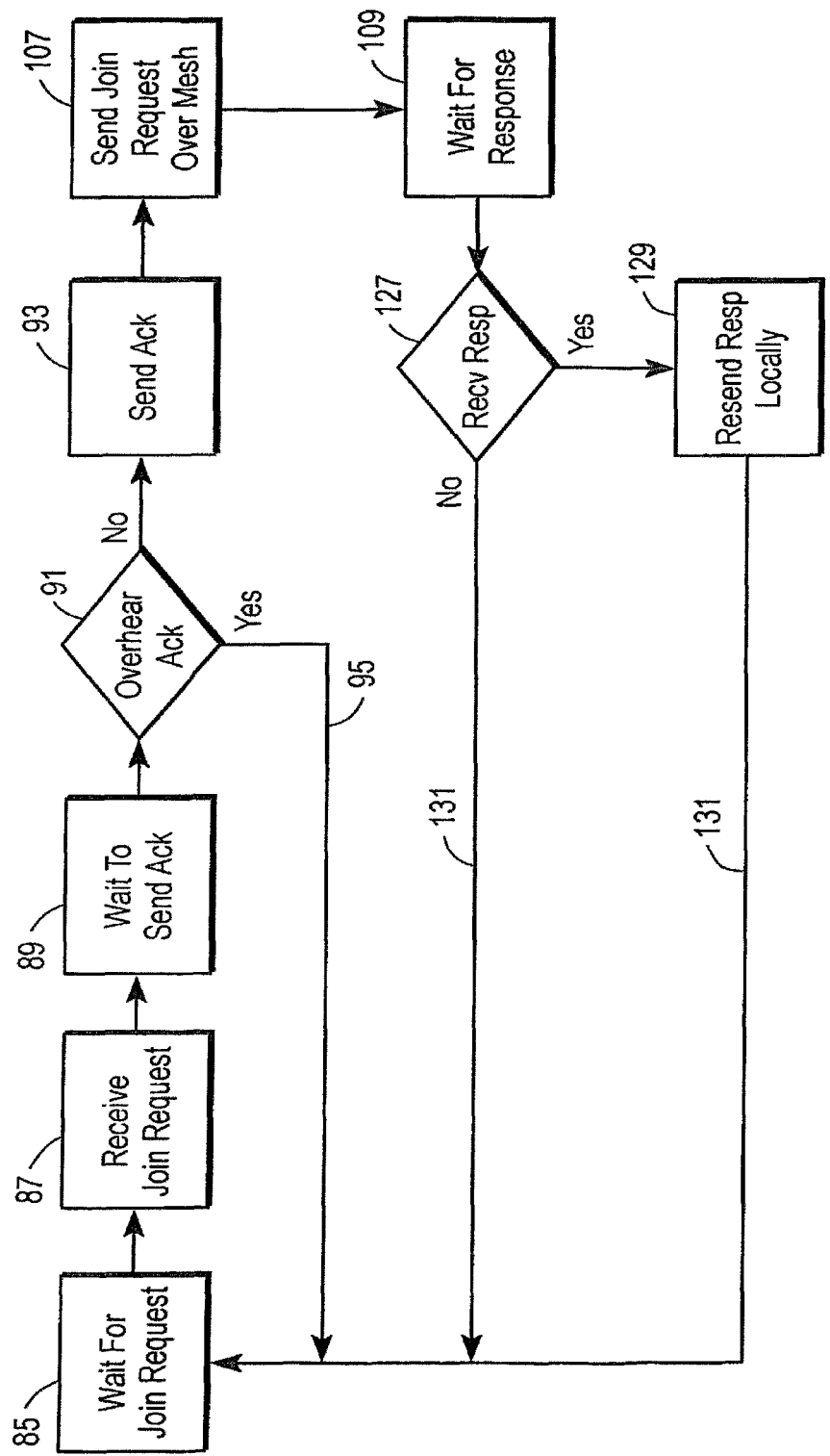
FIG. 8 is a flow chart illustrating operation 5 of a Joined Node in accordance with the present invention.

In operation, as illustrated in the flow chart of FIG. 7, a new module 9 disposed to enter an operating network of modules as a New Node initially broadcasts a Join Request within the local neighborhood of modules on a selected Radio Frequency. In networks operating at a given time on one of several different Radio Frequencies (as later described in detail herein), the New Node broadcasts 83 the Join Request at one of the several different Radio Frequencies 81. Modules 9 operating in the vicinity of the New Node routinely operate as previously described herein with reference to FIGS. 2, 3, 5 and 6 and additionally operate in accordance with the routine as illustrated in FIG. 8. Thus, a Joined Node is capable of sensing 85 a Join Request from such New Node in its vicinity. Upon receipt 87 of a Join Request, such Joined Node waits a random interval 89 during which it detects whether an acknowledgement signal was sent by another Joined Node in the vicinity of the New Node that also received the Join Request. If no such acknowledgement signal is received 91, then such Joined Node sends an acknowledgement signal 93 (indicating its status as the proxy or relaying module for the New Node), and also sends the Join Request over the operating network of modules 9 to the Base Station for that network.

Any other acknowledgement signal received 95 during the initial wait interval indicates that another Joined Node also having received the Join Request (and having a shorter random wait interval) shall serve as the proxy or relaying module for the New Node.

The New Node (operating according to the flow chart of FIG. 7) waits 97 to receive an acknowledgement signal and, if one is received 99, then waits 101 for a response to join the network in accordance with conditions and provisions established for the New Node by the Base Station (as later described herein). Receipt of an acknowledgement signal also indicates a correct selection of a Radio Frequency on which the network is operating.

Absence of an acknowledgement signal received within a delay interval 103 indicates incorrect selection of Radio Frequency (e.g., at that operational interval of the network), and a new one of the set of Radio Frequencies is selected 105 by which to again send a Join Request 83.

The Joined Node that shall serve as the proxy or relaying module also sends 107 the Join Request over the network, or Mesh, to the Base Station (per FIG. 8) and waits 109 for a return response therefrom through the Mesh.

Figure 9:
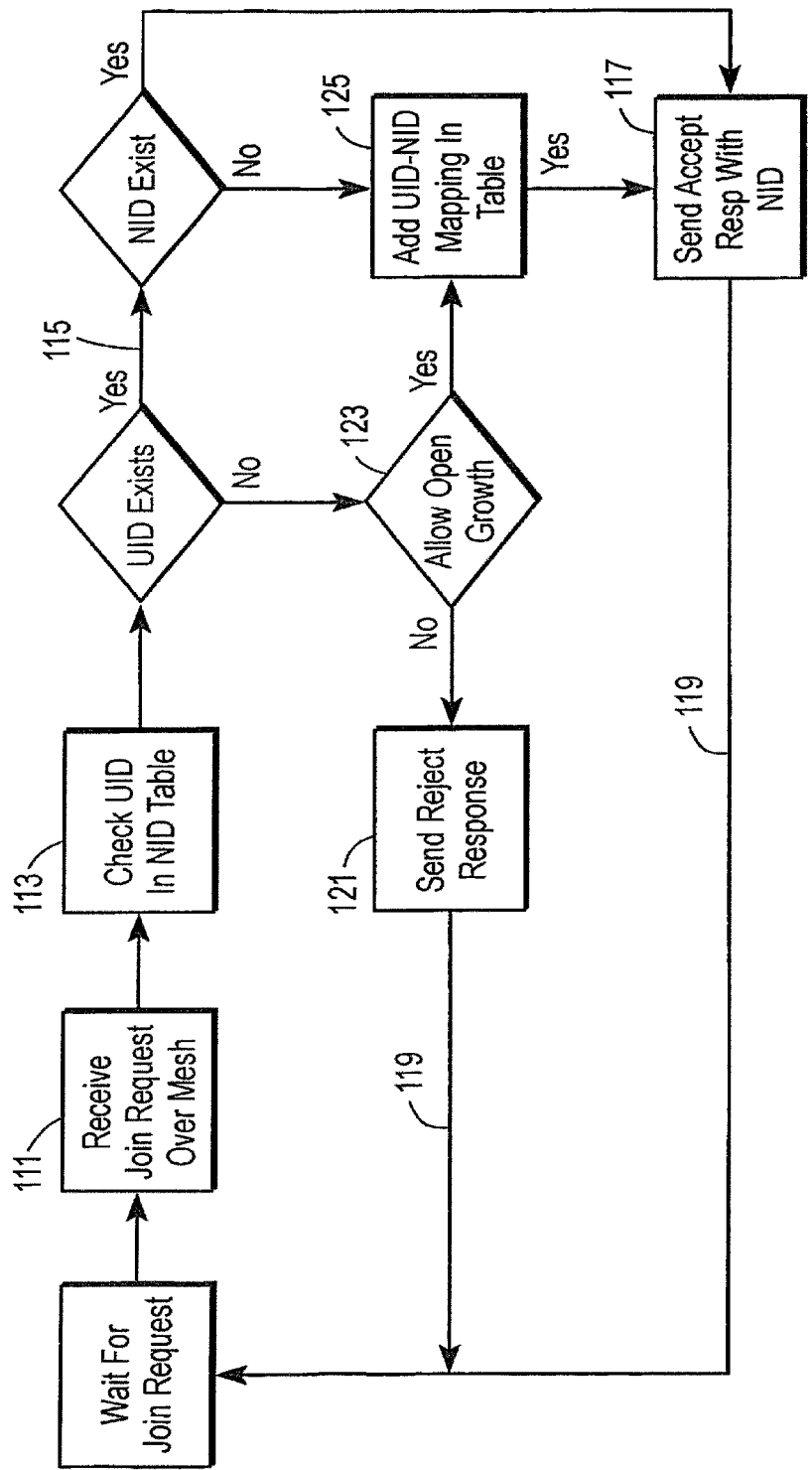
FIG. 9 is a flow chart illustrating operation of a Base Station in accordance with the present invention.

As illustrated in the flow chart of FIG. 9, the Base Station including a gateway 21 and computer 19 with associated database 23 also operates on received Join Requests in addition to operations as previously described herein. If a Join Request is received 111 over the Mesh, the database 23 including a listing of unique ID's for authentic modules is checked 113 and, if verified as authentic by entry on the unique ID list 115, the Base Station computer 19 assigns and sends 117 a Network ID, or Node ID, as part of an acceptance signal back to the New Node over the Mesh. A Network or Node ID may be selected, for example, from a stored listing in the Base Station of Nodes not 'heard' from in the Mesh for some period of time (as an indication that the New Node replaces a failed node). Alternatively, a New Network ID or Node ID may be established corresponding to a known physical location in the network.

An unauthentic unique ID for the New Node (e.g., not listed in the database) may determine that a rejection signal should be sent 121 over the Mesh back to the New Node. Alternatively, if the Base Station is to accommodate expansions 123 of the network, then a new unique ID may be added to the database of unique ID's 125, and a new Network ID may be added to the database (e.g., also associated with physical location of the New Node) for transmission back over the Mesh with an acceptance signal 117. The Base Station is then available for continuing control of the network or Mesh as newly configured with the New Node in accordance with operational activities as previously described herein, and is also then available 119 to receive new Join Requests.

As illustrated in the flow chart of FIG. 8, the Joined Node serving as the proxy or relaying module receives back the acceptance (or rejection) signal 127 from the Base Station via the Mesh and relays or resends 129 the acceptance (or rejection) message to the New Node. Thereafter, the Joined Node serving as the proxy or relaying mode is available to operate within the Mesh or network as previously described herein, and also awaits 131 new Join Requests.

As illustrated in the flow chart of FIG. 7, the New Node receives the join response 133 after an interval of processing at the Base Station (as previously described) and transmission through the Mesh. If no such response 133 is received after a delay interval 135, then the New Node is activated to reset to operate on another one of the set of Radio Frequencies to again send a Join Request 83 in the manner as previously described herein. All available Radio Frequencies may be utilized in this manner in order to attain an acceptance signal. After all available Radio Frequencies are utilized in this manner without a resultant acceptance signal, the New Node delays commencing a new cycle of broadcasting a Join Request separately and sequentially on each available Radio Frequency. After each such cycle of broadcasting a Join Request with no resultant acceptance signal, the New Node extends the delay interval prior to starting a new cycle of broadcasting a Join Request to conserve power and to enhance statistical probability of matching a reference or carrier Radio Frequency on which the Mesh is momentarily operating.

In the event a response is received 133 that rejects 137 entry into the Mesh or network, then the New Node may store indication 139 of the group (or assembled network) from which it was rejected and again initiate a new Join Request using another selected Radio Frequency (for possible entry into another assembled network, or group) that is also operational in the vicinity within the broadcast range of the New Node.

Upon receipt by the New Node of an acceptance signal, the New Node also receives a Group ID code or designation for its status and location in the assembled network or mesh. The Group ID may incorporate the unique ID as a mechanism for indicating that the acceptance signal is intended only for such New Node. Additionally, the frequency (if selected from a set of Radio Frequencies) designates the operational frequency to be used when communicating thereafter with any adjacent modules (not necessarily only the proxy or relaying module) during normal Mesh operation. The assigned Group ID and associated physical location within the Mesh now identified at the Base Station is beneficial, for example, for initiating verifying interrogations regarding a suspected intrusion at or near the location of such New Node, as by activating a video camera or other sensors, or the like.

Each module may be advantageously fabricated with ability to operate on any one of several different Radio Frequencies to conveniently facilitate 'matching' a New Node with any Mesh operating on at least one of the set of Radio Frequencies, without having to retain records of which module 9 as fabricated was set for operation in which Mesh at what one of such Radio Frequencies.

Additionally, such modules 9 operable on different ones of a set of Radio Frequencies greatly enhances immunity to jamming and the exclusion of unauthorized modules 9 from joining an operational network. Specifically, as indicated in FIGS. 10A, B, C, a pictorial illustration of a typical network of distributed modules 9 and Base Station 19, 21, 23 that may receive a Join Request broadcast by module 9*a* as a New Node. In this mode of operation, module 9*b* as the Joined Node and proxy (having shorter random delay time than module 9*c* that also received the Join Request) transmits its acknowledgement of the Join Request received (as described-above), and also forwards the Join Request through the network toward the Base Station 19, 21, 23. After processing in the Base Station (as described above), the acceptance signal is returned to the Joined Node 9*b* that then relays the acceptance signal (incorporating the Unique ID as the assigned Network ID) to the New Node 9*a* (as described above). Any unauthorized or incompatible parameters (e.g., not a proper Radio Frequency, not a listed or authorized Unique ID, or the like) inhibits the New Node 9*a* from gaining operational access to the assembled network.

Another overall objective of the present invention is to conveniently reprogram individual modules with updated software using the radio links established between modules and between a module and the base station. New software to be loaded into each of the modules 9, 11, 12 is presented to the base station 19, 21, 23 that maintains a list in the database 23 of the network ID's for all operative modules that are active in the network. The computer 19 in the base station breaks up the new software into small code capsules that can be transmitted within a single radio packet between modules.

Although the base station may maintain a list of the network ID's of all the operative modules, there may not be corresponding geographical information about the location of each module 9, 11, 12. However, the base station 19, 21, 23 maintains information about relative depth of a module within the network, i.e., the number of "hops" a module is displaced from the base station. Thus, a module 9, 11, 12 that is displaced via 2 hops from the base station requires two radio transmissions and an intermediate module serving to relay the radio transmission to the ultimate designated recipient module. Multiple transmission hops and intermediate modules along a transmission path from the base station to a module designated by its network ID consume battery power, so should be managed in an energy-efficient manner.

Each module 9, 11, 12 includes a microprocessor and a limited program memory that is to be updated by new software. Additionally, each module typically has limited battery power so commonly operates in "sleep" mode at low power consumption awaiting sensor or transmission stimulus to trigger full-power operation. Over-The-Air Programming (OTAP) of remote modules 9, 11, 12 from the base station is achieved in accordance with one embodiment of the present invention by storing an OTAP utility or service code in an external memory in each module for access when needed during usually infrequent occasions of reprogramming the module. This obviates the need to consume operational program memory and SRAM memory of a module with infrequently-used OTAP utility program. Instead, such utility program can be loaded from external memory into operational program memory and SRAM only as needed during reprogramming events.

Figure 13:
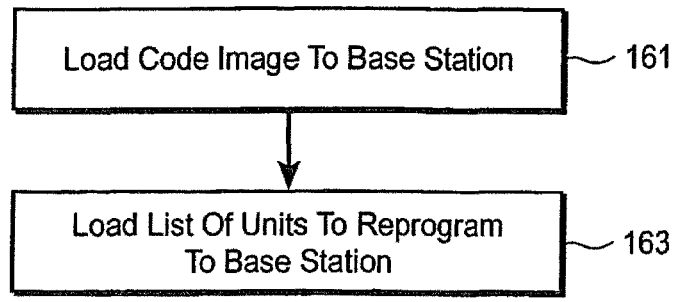
FIG. 13 is a flow chart illustrating an operation of a base station.
Figure 14:
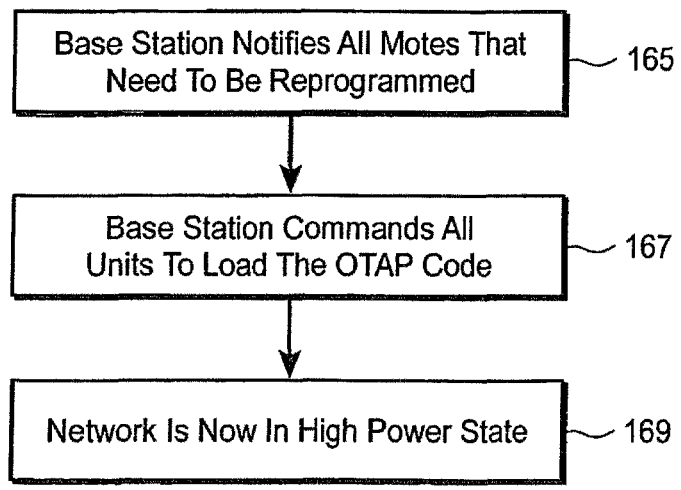
FIG. 14 is a flow chart illustrating another operation of the base station.

Thus, in one embodiment of the present invention as illustrated in FIG. 13, a reprogram for all (or selected subset) of modules 9, 11, 12 is loaded 161 (as a code image) into the base station 19, 21, 23 with a list 163 of the modules identified by their network ID's that are to be reprogrammed. Then, as illustrated in FIG. 14, the base station transmits a message 165 to alert the identified modules (or motes) of the upcoming program updating requirement, and to load the OTAP program 167 (from external memory) into working memory. Low-power operation of the modules 9, 11, 12 usually limits available bandwidth and radio packet throughput, with resultant extended time to reprogram the modules. Thus, the OTAP utility program also initiates full-power operation for higher throughput rate of radio packets. As previously described herein, the base station 19, 21, 23 breaks up the new program into capsules of the program of bit-size small enough to be contained within radio packets that are transmitted between modules. Thus, greater rates of capsules/second transmission are achieved at high power, higher bandwidth operations of the modules. After the new program is received, the network of modules is commanded by the base station communicating through the modules as previously described herein to load the new program and return to the low-power sleep-mode operating state.

Figure 15:
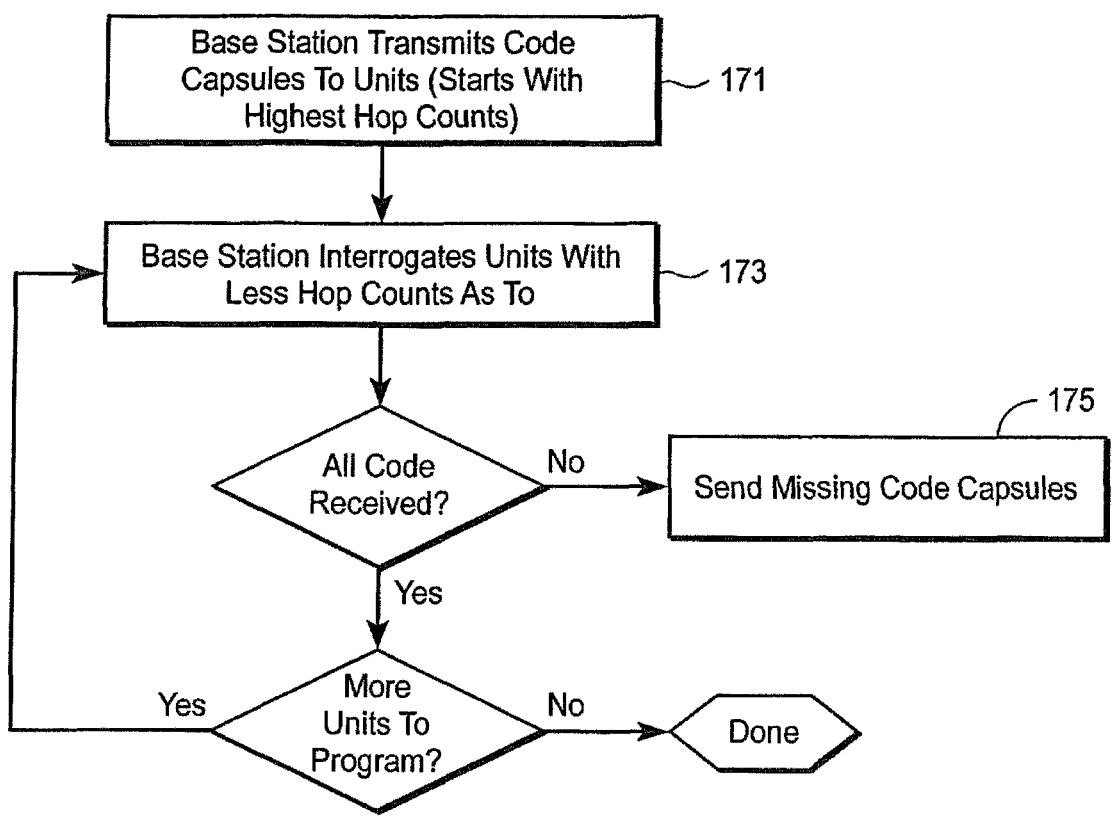
FIG. 15 is a flow chart illustrating an accelerated operation of the base station.

In accordance with another embodiment of the present invention, the reprogramming of the modules is accelerated using "promiscuous listening" in a manner as illustrated in FIG. 15. That is, a module which is likely to require reprogramming, and that receives or overhears the radio transmission of program capsules being transmitted between other modules, will store the overheard program capsules. Since the base station maintains data indicative of the relative depth of designated modules within the network (i.e., by "hop" count), the new program is initially sent to modules at highest hop counts 171. This assures that intermediate modules as relayers of capsule transmissions, as well as adjacent modules in reception range, also receive and can store the transmitted program or code capsules. With high probability that such modules will also require the updated program, these modules may store the overheard program capsules in advance of being designated to receive specific radio packets. After the base station has sent code capsules to the intended module of high-order hop count, the other modules are polled 173 by the base station to determine which code capsules each module still requires. Only missing code capsules 175 are then sent by the base station to a designated module (usually of lower hop count). In this way, all modules can be reprogrammed more rapidly than by iterative, repetitious complete transmission of the same code capsules to each designated module.

As the new code image (i.e., the new software) is loaded into modules in the manner as described above, the modules switch back to low-power operating state within the network. Thus, some modules earlier loaded with code capsules will operate in low-power (usually low bandwidth) network state while other modules continue operating in high power state, with resultant loss of transmitted messages and possible disruption of the network. In accordance with an embodiment of the present invention, a re-boot command is sent by the base station to the modules of the network following loading of the new code image to all modules. The reboot command includes a variable delay that is longer for modules of higher hop count, to accommodate longer transmission times of the reboot command through intermediate, relaying modules.

In accordance with another embodiment of the present invention, as illustrated in the pictorial diagram of FIG. 11, a plural number of separately operable networks may be assembled within each of the Meshes 141, 143, 145 using compatible modules 9 under control of a separate Base Station 147, 149, 151 in each Mesh. Each of the Base Stations 147, 149, 151 and the associated Mesh 141, 143, 145 are operable at a plurality of different Radio Frequencies as the reference or carrier frequency over which the communication channels throughout the network are established (as discussed above). A particular set of a plural number of Radio Frequencies (selected, for example, from within the allowable bandwidth of the Business. Radio Service established by the Federal Communications Commission) and designated as frequencies 1, 2, 3 and 4 are shown listed in the attached Table of FIG. 12. Of course, more than 4 Radio Frequencies and more than 4 networks may be used. These frequencies are shifted in successive time intervals, for example, in accordance with the sequence illustrated in the Table to avoid overlapping interactions between even adjacent modules operating at different Radio Frequencies in separate networks. The synchronizing of such frequency shifts is accomplished via signals transmitted between Base Stations 147, 149, 151 along the communication links 153 using any conventional schemes and protocols. Alternatively, frequency shifts to encoded Radio Frequencies may be accomplished in random or pseudo-random manner using such coded information distributed to modules and Base Station of each network at selected periodic or aperiodic intervals. In this way, interactions are inhibited even at adjacent locations between otherwise compatible modules operating in different networks at different Radio Frequencies at any given time.

In another embodiment of the present invention, an adaptive network of a plurality of modules, for example as illustrated in FIG. 1, includes at least one remote module such as 11, 12 that is not commonly engaged in reception and transmission of signals as part of a communication channel across the network between a base station and other modules. Such modules (referred to herein as 'leaf nodes') are commonly disposed at an end of communication branch channels, and are typically less active in the network of modules. A module operating as a leaf node in an adaptive network may therefore conserve power by reverting to a 'sleep' mode of operation during which low-power operation preserves responsiveness only to broadcast signals containing the specific address or other identification code of the leaf node. In this way, a leaf node may conserve battery power for longer, lower-maintenance operation in the network. Additionally, such modules operating as leaf nodes may remain in 'sleep' mode for extended periods of time of the order of hours or days, during which time the network of modules, or at least transmission conditions within the network may have changed.

It is desirable to have a leaf node locate and store information representing a best radio link between the leaf node and an adjacent module prior to the leaf node reverting to a sleep mode of operation. In this way, upon awakening from the sleep mode, the leaf node re-establishes a communication channel with the adjacent modules about which the leaf node previously stored information about the associated radio link.

In the absence of any changes in the Adaptive network of modules, and in the absence of any corruption of transmission conditions, the leaf node may re-establish communications over the radio link of stored information using minimal few transmission exchanges, with concomitant conservation of battery power.

However, under changed conditions within the network of modules, information about a best radio link to an adjacent module as previously stored prior to reversion to the sleep mode may no longer be operational. Quality of radio links can change quickly attributable to objects moving through; or newly positioned in a transmission path, interference from other sources of radio signals, and the like. In such changed circumstances, the leaf node upon awakening must select a new adjacent module before successfully communicating again within the network of modules. Additional energy is expended transmitting signals to the module previously in adjacent relationship before the leaf node can determine absence, or poor quality, of a radio link to the adjacent module associated with the stored information. Also, if the leaf node is normally awakened by reception of a command transmitted through the network of modules from a base station, the leaf node may perpetuate the sleep mode of operation without a recognition of the failed radio link to the adjacent module.

Figure 16:
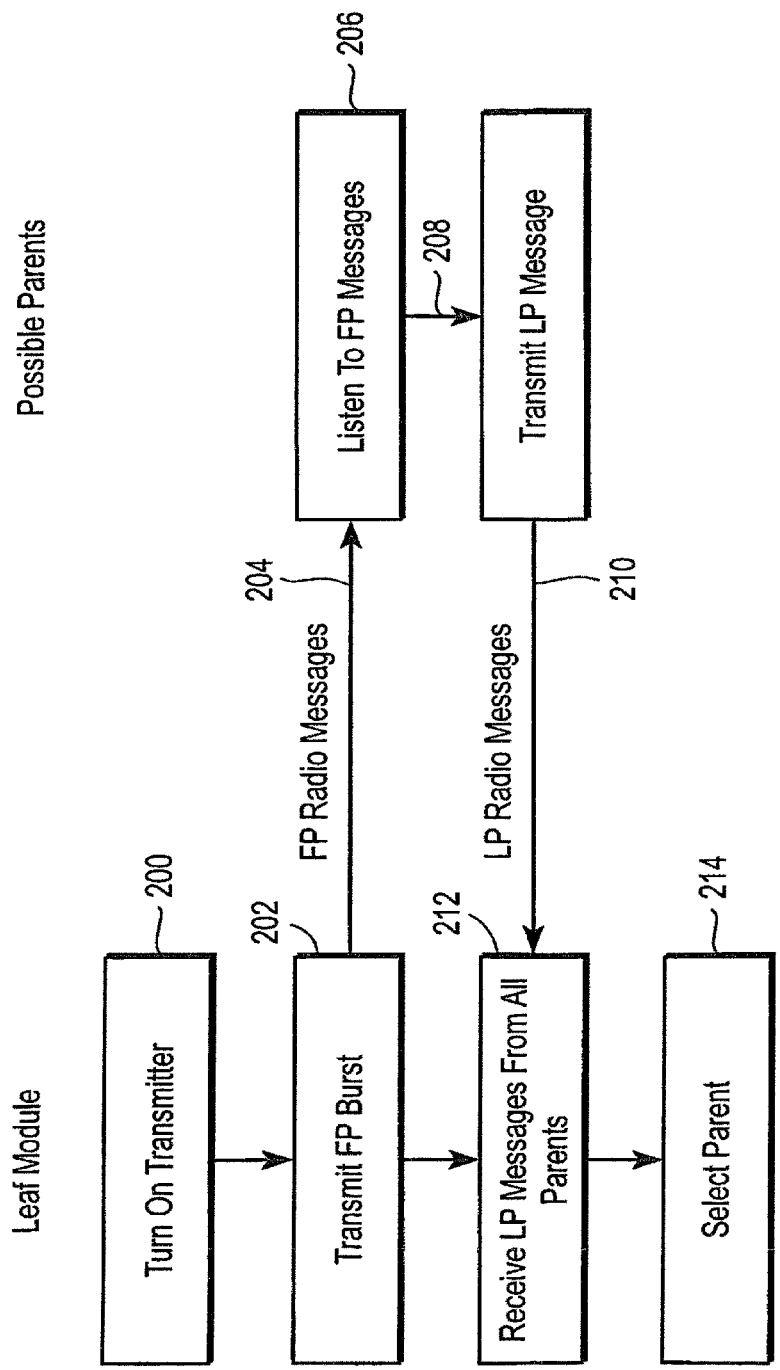
FIG. 16 is a flow chart illustrating one operational mode.

In accordance with one embodiment of the present invention, a module that is operable in a self-adaptive mesh network is operable as a leaf node (e.g. as installed, or as more remote modules are removed or rendered inoperable). As illustrated in the flow chart of FIG. 16, a module that awakens from a sleep mode must find a parent node (i.e., a best radio-approximate adjacent module) with which to communicate. Such awakening of a module may occur at internally-timed intervals, or upon sensing of an event, or the like, and initiates turn-on of its transmitter 200 to transmit 202 a brief burst of messages 204 of a type characterized as FP (Find Parent), containing N number of such messages to all possible parent modules within radio range. The time intervals (TI) between each of the N messages are the same, and all modules use the same number N of messages spaced by the same TI. Thus, all possible parent modules expect FP-type messages to contain N messages at TI spacing in a received burst message. Optionally, a succession of the N messages in a burst may be transmitted at progressively lower (or greater) signal strengths, and contain information such as an address or identification code that identifies the leaf-node module, and also contain information about which of the number N the message represents (i.e., 1 to N).

All modules in the vicinity as possible parent nodes monitor FP bursts and count the number of messages (up to N) received within the burst. The number of messages received and counted are logically calculated against known N to yield a percentage of messages actually received. Additionally, the possible parent modules need only monitor for the known interval (TI×N) to avoid excessive receiver operation with concomitant waste of energy.

All possible parent modules in the radio-receiving vicinity of the transmitting leaf node may determine 208 (after the full TI×N transmission interval) that some messages are missing from the received burst, and transmit a Located Parent-type (LP) message 210 containing Percent Received (PR) information. Additionally, such LP-type message may also include a number of 'hops' (and hence COST) required for such possible parent module to relay communications through the mesh network to a base station.

The leaf node reverts to receiver operation following its transmission of the FP-type message and before returning to 'sleep' mode in order to monitor 212 responses broadcast by possible parent modules. Among LP-type messages thus received containing PR and COST information associated with each possible parent module, the leaf node may also monitor received radio signal strength (RSSI) of the reply/received LP-type message to determine quality of communications over radio links with each responding possible parent module. The possible parent module preferably with the best PR, lowest COST, and highest RSSI (or selected weighted combinations thereof) is selected 214 by the leaf node to serve as its parent node. This procedure to identify a parent node results in low energy consumption since the time to locate a parent node is determined substantially by how rapidly the leaf node can broadcast the burst of N messages and remain awake to monitor the responses. Additionally, this procedure results in finding a quality bidirectional radio link for both transmitting and receiving messages. Identification information in the LP-type message received from a selected parent node is then stored by the leaf node prior to reverting to sleep mode of operation. Similarly, the selected parent node stores identification information about the leaf node to facilitate efficient establishment of a communication channel between them in a subsequent interval.

Figure 17:
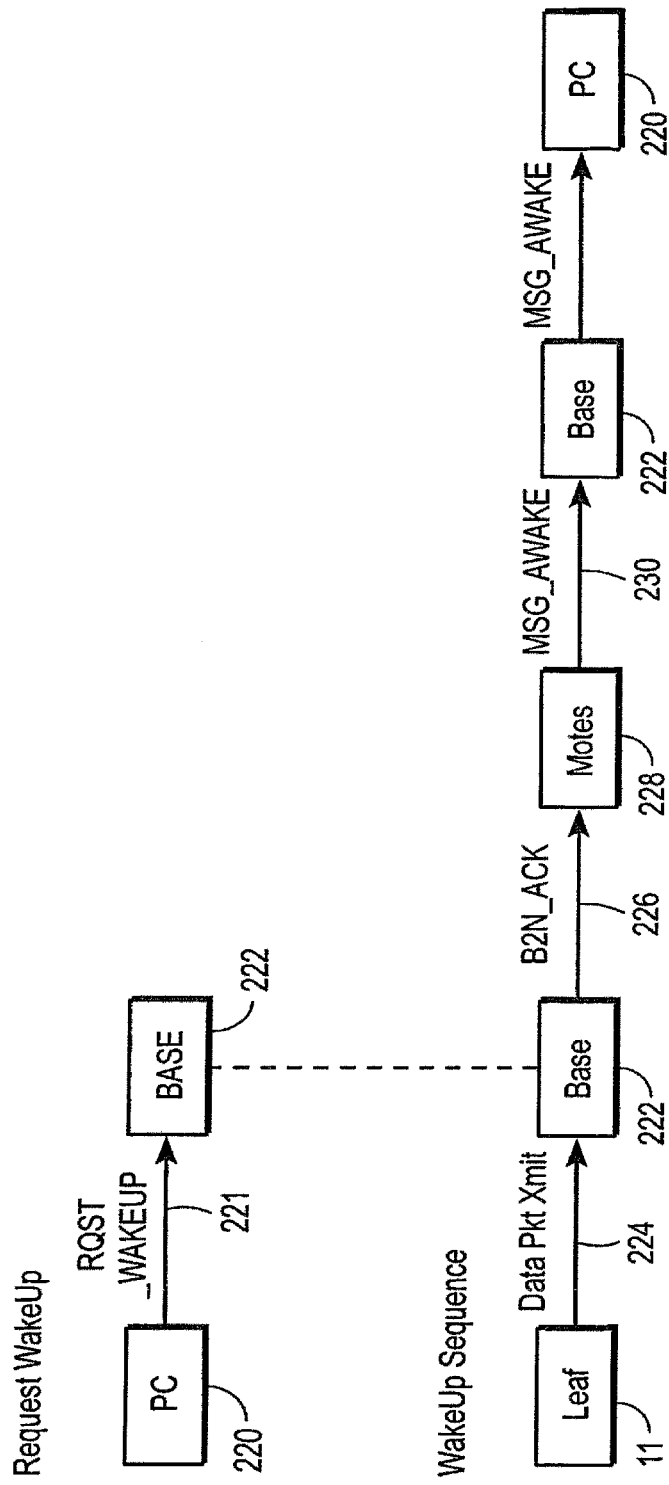
FIG. 17 is a pictorial illustration of another operational mode in accordance with the present invention.

In another embodiment of the present invention a leaf node may communicate with a base station across a mesh network in accordance with operating procedures, for example as pictorially illustrated in FIG. 17. Specifically, the central computer 220 that commands a mesh network of interactive modules, including at least one module that operates as a leaf node, may condition the base station 222 to execute a command to a specific leaf node in response to its next transmission across the mesh network. Such next transmission by the specified leaf node may be predicted with respect to wake up from sleep mode of known timing and duration, or may be random in response to a sensed condition. A leaf node transmission is progressively relayed via one or more radio links between modules of the mesh network in a manner as previously described herein.

The command 221 from the central computer 220 to the base station 222 (RQST_WAKEUP) alerts the base station to transmit a command to the specified leaf node, in response to its next transmission, that the leaf node must remain awake to receive following messages. Upon awaking from sleep mode, leaf node 11 transmits a data packet (Data Pkt Xmit) 224 that is relayed through one or more 'hops' among communication channels between modules in a manner as previously described herein. In response to receipt of such data packet at the base station 222, it responds to the command previously received (and buffered or stored) from the central computer to return an acknowledgment message (B2N_Ack) 226 that is modified to include the command for the leaf node to remain awake (i.e., not to revert to sleep mode). Such message is communicated to the leaf node via one or more 'hops' among communication channels between modules (or motes 228) in a manner as previously described herein.

Receipt of the modified acknowledgment message 226 by the specified leaf node 11 includes an initiated transmission of a response message (MSG_AWAKE) 230 that is communicated over the mesh network to the base station 222 for relay back to the central computer 220. The specified leaf node may now be commanded by the central computer 220 to perform some particular operation such as update internal program, report a monitored condition, or the like. Upon completion of commands from the central computer 220 in this manner, the leaf node may revert to sleep mode upon command, or upon completion of commanded operation, or the like.

Therefore, one or more modules operating in a self-adaptive mesh network of such modules may conserve limited battery power by reverting to sleep-mode operation and by actively adapting to any changes in the adaptive mesh network upon awakening from sleep mode. In addition, sensor modules deployed in a such a self-adaptive mesh network greatly facilitate establishing surveillance within and around a secure area without time-consuming and expensive requirements of hard-wiring of modules to a central computer. In addition, data signals generated by, or received from other adjacent modules and re-transmitted among adjacent modules promotes self-adaptive formation of distributed sensing networks that can self configure around blocked or inoperative modules to preserve integrity of the surveillance established by the interactive sensing modules. Adaptive activity of a new node seeking operable access to an existing network facilitates engagement of a standard module into unique operational relationship within the network. Modules operating as leaf nodes of the network conserve power during sleep mode and actively adapt to changed network conditions upon awakening from sleep mode.

What is claimed is:

1. An adaptive network including a control module and a plurality of interactive modules adaptively communicating with the control module, the adaptive network comprising:

at least one of the plurality of modules configured to be operable in a sleep mode and in an interactive mode as a leaf node in the adaptive network and to selectively transmit a first message, indicating that the at least one module has exited the sleep mode, to the control module via communication channels between one or more of the plurality of modules in the adaptive network;

said control module configured to receive and implement instructions to transmit a command to the at least one module, in response to receipt of the first message from the at least one module, instructing the at least one module not to revert to sleep mode; and said control module configured to, in response to receiving the first message from the at least one module, transmit, to the at least one module, a second message acknowledging receipt of the first message and the command instructing said at least one module not to revert to sleep mode.

2. A method for operating a self-adaptive network including a control module and a plurality of interactive modules adaptively communicating with the control module in which at least one of the plurality of modules is operable in a sleep mode and in an interactive mode as a leaf node in the self-adaptive network, the method comprising:

when the at least one module has exited the sleep mode, selectively transmitting a first message, indicating that the at least one module has exited the sleep mode, from said at least one module to the control module via communication channels between one or more of the plurality of modules and the control module;

receiving instructions at said control module to transmit a command to the at least one module, in response to receipt of the first message from the at least one module, instructing the at least one module not to revert to sleep mode; and transmitting from the control module to the at least one module, in response to receipt of the first message from the at least one module, a second message acknowledging receipt of the first message and the command instructing said at least one module not to revert to sleep mode.

3. The self-adaptive network of claim 1, wherein the at least one module, when in the sleep mode, only responds to broadcast signals containing a specific identifier corresponding to the at least one module.

4. The self-adaptive network of claim 1, wherein the at least one module is configured to identify an adjacent module as having a best radio link and store information representing the identified adjacent module prior to entering the sleep mode.

5. The self-adaptive network of claim 4, wherein the at least one module is further configured to re-establish a communication channel with the identified adjacent module, using the stored information, upon awakening from the sleep mode of operation.

6. The method according to claim 2, further comprising:

said at least one module operating in the sleep mode only responding to broadcast signals containing a specific identifier corresponding to the at least one module.

7. The method according to claim 2, further comprising:

said at least one module operating as the leaf node identifying an adjacent module as having a best radio link and storing information representing the identified adjacent module prior to entering the sleep mode of operation.

8. The method according to claim 7, further comprising:

upon awakening from sleep mode, said at least one module attempting to re-establish a communication channel with the identified adjacent module using the stored information prior to attempting to communicate with any other module in the network.

9. The method according to claim 7, further comprising:

upon awakening from sleep mode, said at least one module re-establishing a communication channel with the identified adjacent module using the stored information.

* * * * *